(12) United States Patent
Yoshida

(10) Patent No.: US 9,223,183 B2
(45) Date of Patent: Dec. 29, 2015

(54) LIQUID CRYSTAL DISPLAY DEVICE

(71) Applicant: Sharp Kabushiki Kaisha, Osaka (JP)

(72) Inventor: Masahiro Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/391,440

(22) PCT Filed: Apr. 4, 2013

(86) PCT No.: PCT/JP2013/060353
§ 371 (c)(1),
(2) Date: Oct. 9, 2014

(87) PCT Pub. No.: WO2013/154022
PCT Pub. Date: Oct. 17, 2013

(65) Prior Publication Data
US 2015/0085215 A1    Mar. 26, 2015

(30) Foreign Application Priority Data

Apr. 10, 2012 (JP) ................. 2012-089038

(51) Int. Cl.
| | |
|---|---|
| *G02F 1/136* | (2006.01) |
| *G02F 1/1362* | (2006.01) |
| *G02F 1/1335* | (2006.01) |
| *G02F 1/1337* | (2006.01) |
| *G02F 1/1333* | (2006.01) |
| *G02F 1/1343* | (2006.01) |
| *G02F 1/1368* | (2006.01) |
| *G02F 1/137* | (2006.01) |

(52) U.S. Cl.
CPC .......... *G02F 1/136286* (2013.01); *G02F 1/137* (2013.01); *G02F 1/1368* (2013.01); *G02F 1/133345* (2013.01); *G02F 1/133512* (2013.01); *G02F 1/133707* (2013.01); *G02F 1/134309* (2013.01); *G02F 1/136213* (2013.01); *G02F 1/136227* (2013.01); *G02F 2001/13712* (2013.01)

(58) Field of Classification Search
None
See application file for complete search history.

(56) References Cited

U.S. PATENT DOCUMENTS

| | | |
|---|---|---|
| 2008/0068516 A1 | 3/2008 | Mori et al. |
| 2010/0320472 A1* | 12/2010 | Liu ................ G02F 1/136259 257/59 |
| 2012/0307172 A1 | 12/2012 | Yoshida |

FOREIGN PATENT DOCUMENTS

| | | |
|---|---|---|
| JP | 2008-70763 A | 3/2008 |
| WO | 2011/096390 A1 | 8/2011 |

* cited by examiner

*Primary Examiner* — Richard Kim
(74) *Attorney, Agent, or Firm* — Chen Yoshimura LLP

(57) ABSTRACT

The TFT substrate of this liquid crystal display device has: a first gate bus line and a second gate bus line; a first data bus line; a first TFT and second TFT that are respectively connected to the first and second gate bus line and are both connected to the first data bus line; and a first pixel electrode and second pixel electrode that are respectively connected to the first TFT and the second TFT through a contact hole. The first and second gate bus line traverse the first pixel electrode and the second pixel electrode, and a black matrix has a portion that integrally covers the first TFT and the contact hole, and a portion that integrally covers the second TFT and the contact hole.

15 Claims, 12 Drawing Sheets

(a)

(b)

LIQUID CRYSTAL DISPLAY DEVICE

TECHNICAL FIELD

The present invention relates to a liquid crystal display device.

BACKGROUND ART

Display devices used in flat-screen televisions, personal computers, and smartphones have active matrix type liquid crystal display devices with thin film transistors as switching elements. Examples of liquid crystal display devices under development that have wide viewing angle characteristics include liquid crystal display devices and the like utilizing VA (vertical alignment) mode, IPS (in-plane switching) mode, which is a horizontal electric field mode, or FFS (fringe field switching) mode.

Known VA mode liquid crystal display devices include MVA (multi-domain vertical alignment) mode liquid crystal display devices, in which one pixel includes a plurality of domains with liquid crystals that have differing orientations from each other. Also, CPA (continuous pinwheel alignment) mode liquid crystal display devices in which the liquid crystal orientation direction continuously varies around a rivet or the like formed on an electrode at the center of a pixel are known.

Patent Document 1 discloses an MVA mode liquid crystal display device provided with pixel electrodes each having a plurality of fine slits (narrow cuts) extending in the directions of azimuthal angles 45°, 135°, 225°, and 315°. Pixel electrodes with this type of shape are called "fishbone-like pixel electrodes" or "comb tooth pixel electrodes." Liquid crystal molecules are oriented parallel to the slits when a voltage is being applied, whereby the four-domain alignment structure can be realized.

Patent Document 1 discloses a configuration in which a protruding structure is provided in a pixel area. The protruding structure is for restricting the orientation of liquid crystal molecules and for maintaining the cell gap (thickness of the liquid crystal layer) as a spacer.

RELATED ART DOCUMENTS

Patent Documents

Patent Document 1: WO 2011/096390
Patent Document 2: Japanese Patent Application Laid-Open Publication No. 2008-70763

SUMMARY OF THE INVENTION

Problems to be Solved by the Invention

Meanwhile, there have been attempts to reduce the number of data drivers connected to data bus lines to decrease the manufacturing cost of liquid crystal display devices. In general, data drivers are more expensive than gate drivers that are connected to gate bus lines. Therefore, in terms of cost, it is advantageous to reduce the number of data drivers.

Furthermore, by reducing the number of data bus lines, the space for wiring provided in the frame region (non-display region provided towards the outside of the display region of the liquid crystal display device) can be designed to be narrow. As a result, a narrow frame region can be realized.

Patent Document 2 discloses a configuration for reducing the number of data bus lines of a liquid crystal display device. In this liquid crystal display device, two pixels aligned in the horizontal direction are connected to different gate bus lines, with the data bus line being connected to both of the pixels. This type of method in which two gate bus lines are provided for a column of pixels aligned in one direction is sometimes called a dual scan line method. With the dual scan line method, the number of gate bus lines doubles, but the number of data bus lines halves, and thus the number of lead-out lines of the data bus line and the number of data drivers in the frame area can be reduced.

However, the configuration of the liquid crystal display device disclosed in Patent Document 2 has two adjacent gate bus lines provided between two pixels aligned in the vertical direction. With this configuration, there have been cases in which the aperture ratio of a pixel decreases due to securing a space between two pixels to provide the two gate bus lines.

The present invention was made to solve the above-mentioned problems, and aims at providing a liquid crystal display device with better display quality while reducing the number of data bus lines.

Means for Solving the Problems

A liquid crystal display device according to one aspect of the present invention has: a thin film transistor substrate; an opposite substrate; a liquid crystal layer disposed between the thin film transistor substrate and the opposite substrate, the liquid crystal layer being formed of liquid crystal material having a negative dielectric anisotropy; and a black matrix disposed on an outside of the liquid crystal layer, the black matrix having light-shielding characteristics, wherein the thin film transistor substrate includes: a first gate bus line extending along a first direction, and a second gate bus line extending parallel and adjacent to the first gate bus line; a first data bus line extending along a second direction that intersects with the first direction; a first thin film transistor and a second thin film transistor that are respectively connected to the first gate bus line and the second gate bus line and that are both connected to the first data bus line, the first thin film transistor and the second thin film transistor being disposed along the first direction side-by-side; and a first pixel electrode and a second pixel electrode that are respectively connected to the first thin film transistor and the second thin film transistor through a first contact hole and a second contact hole, respectively, the first pixel electrode and the second pixel electrode being disposed along the first direction side-by-side, wherein, when seen from a direction normal to the thin film transistor substrate, the first gate bus line and the second gate bus line cross the first pixel electrode and the second pixel electrode and are disposed so as to overlap the first pixel electrode and the second pixel electrode, and wherein the black matrix has a first inter-pixel light-shielding portion that covers both the first thin film transistor and the first contact hole and a second inter-pixel light-shielding portion that covers both the second thin film transistor and the second contact hole.

In one aspect, the first thin film transistor, the second thin film transistor, the first contact hole, and the second contact hole are disposed so as to be sandwiched between the first gate bus line and the second gate bus line in a plan view.

In one aspect, the thin film transistor substrate further includes: a first insulating layer formed on the first thin film transistor and the second thin film transistor; an auxiliary capacitance electrode formed on the first insulating layer, the auxiliary capacitance electrode having, for each of the first contact hole and the second contact hole, at least one opening corresponding thereto; and a second insulating layer formed on the auxiliary capacitance electrode and formed below the first pixel electrode and the second pixel electrode, wherein the first contact hole and the second contact hole penetrate the first insulating layer, the opening in the auxiliary capacitance electrode, and the second insulating layer.

In one aspect, the auxiliary capacitance electrode includes a first portion that overlaps the first inter-pixel light-shielding portion of the black matrix, a second portion that overlaps the second inter-pixel light-shielding portion of the black matrix, and an opening that overlaps the first pixel electrode and the second pixel electrode on an outside of the first portion and the second portion.

In one aspect, the auxiliary capacitance electrode is formed of a non-transparent conductive material.

In one aspect, in the above-mentioned liquid crystal display device, at least one protruding structure provided between the thin film transistor substrate and the opposite substrate, wherein the protruding structure overlaps at least one of the first inter-pixel light-shielding portion and the second inter-pixel light-shielding portion of the black matrix when seen from the direction normal to the thin film transistor substrate.

In one aspect, the protruding structure is at least one portion of an orientation regulating structure and a protruding structure formed as a columnar spacer.

In one aspect, the protruding structure further includes: a first protruding structure that is located in a center portion of the first pixel electrode and overlaps the first inter-pixel light-shielding portion when seen from the direction normal to the thin film transistor substrate, a second protruding structure that is located in a center portion of the second pixel electrode and overlaps the second inter-pixel light-shielding portion when seen from the direction normal to the thin film transistor substrate.

In one aspect, the first protruding structure is disposed so as to at least partially overlap the first thin film transistor and the first contact hole, and wherein the second protruding structure is disposed so as to at least partially overlap the second thin film transistor and the second contact hole.

In one aspect, the first protruding structure and the second protruding structure respectively control the orientation of liquid crystal molecules in the liquid crystal layer such that the liquid crystal molecules are respectively oriented around the first protruding structure and the second protruding structure in a radial manner when voltage is applied.

In one aspect, the first pixel electrode and the second pixel electrode respectively include a plurality of first branch electrodes that extend in a third direction, a plurality of second branch electrodes that extend in a fourth direction, a plurality of third branch electrodes that extend in a fifth direction, and a plurality of fourth electrodes that extend in a sixth direction, the third direction, the fourth direction, the fifth direction, and the sixth direction being different from each other.

In one aspect, the thin film transistor substrate further includes: a second data bus line that extends along the second direction and that is adjacent to the first data bus line; and a pair of thin film transistors and a pair of pixel electrodes that are connected to the second data bus line and arranged along the first direction, wherein one of the first pixel electrode and the second pixel electrode connected to the first data bus line and one of the pair of pixel electrodes connected to the second data bus line are arranged along the first direction so as to be sandwiched between the first data bus line and the second data bus line.

In one aspect, the thin film transistor substrate further includes a light-shielding member that extends along the second direction in a gap between the two pixel electrodes that are sandwiched between the first data bus line and the second data bus line.

In one aspect, the light-shielding member is formed of a same material as the first data bus line and the second data bus line or a same material as the first gate bus line and the second gate bus line.

In one aspect, in the above-mentioned liquid crystal display device, a data driver connected to the first data bus line and a gate driver connected to the first gate bus line and the second gate bus line, wherein the data driver and the gate driver are formed so as to be adjacent or formed integrally in a periphery of a display region.

Effects of the Invention

According to a liquid crystal display device of an embodiment of the present invention, excellent display quality can be realized while reducing the number of data bus lines.

BRIEF DESCRIPTION OF THE DRAWINGS

FIG. 4 is a plan view showing Embodiment 1 of the liquid crystal display device, in which
FIG. 4(a) shows a TFT, a pixel electrode, and the like, FIG. 4(b) shows an auxiliary capacitance electrode,
and FIG. 4(c) shows a black matrix and a protruding structure.
FIG. 5 is a plan view showing the entire TFT substrate of Embodiment 1, and shows a display region, a driver chip disposed towards the outside of a display region, and the like.
FIG. 9(a) shows the entire structure of a pixel and FIG. 9(b) shows an auxiliary capacitance electrode.
FIG. 13 shows a circuit configuration of the liquid crystal display device in one embodiment of the present invention, in which
FIG. 13(a) shows a circuit configuration of Embodiment 1 shown in FIG. 1,
and FIG. 13(b) shows a circuit configuration of Embodiment 5.

DETAILED DESCRIPTION OF EMBODIMENTS

Figure 1:
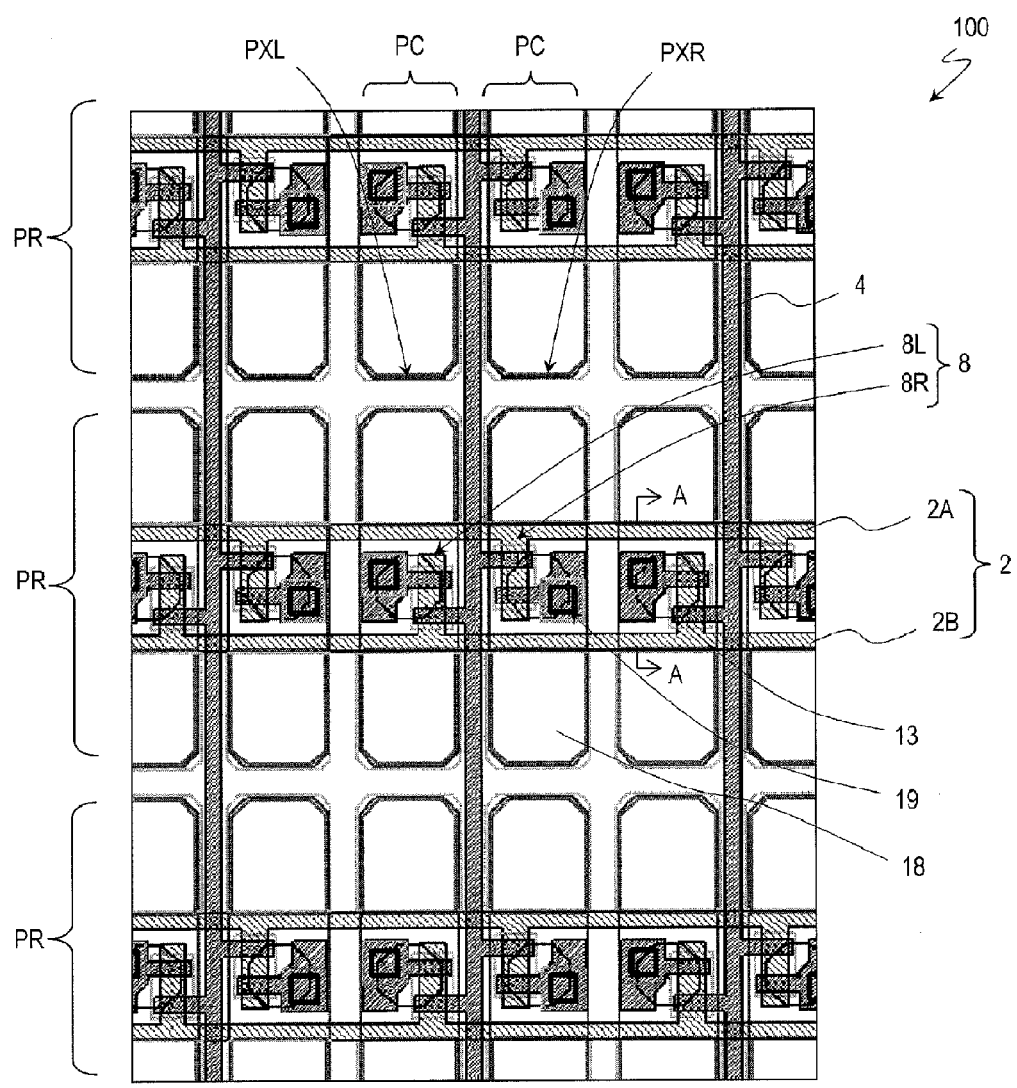
FIG. 1 is a plan view showing a liquid crystal display device according to Embodiment 1 of the present invention.

The liquid crystal display device of one embodiment of the present invention is a VA mode (CPA mode or MVA mode, for example) liquid crystal display device that is formed of a liquid crystal material with a negative dielectric anisotropy, and adopts a dual scan line method. In other words, two gate bus lines (scan lines) are provided for one line of pixels that are aligned in the direction in which the gate bus line extends (horizontal direction), and each data bus line (signal line) that extends along the vertical direction is connected to both of the two pixels that are adjacent to each other at the line of pixels. In this configuration, the data bus line is provided for every two pixels in the line of pixels mentioned above.

According to this liquid crystal display device, the number of data bus lines can be decreased, and thus the number of data drivers can be decreased, leading to reduced manufacturing cost. Furthermore, in the frame region, the number of wiring lines connected to the data bus line can be reduced, thus the area where the wiring lines are provided can be made narrow. As a result, a narrow frame region can be realized.

Furthermore, the liquid crystal display device of one embodiment of the present invention concentrates the areas that need to be shielded from light in certain areas and integrally shields these areas with a light-shielding member (black matrix). Thus, two gate bus lines that are adjacent to each other are provided for each line of pixels and are disposed so as to overlap a pixel electrode (typically, so as to cross the center of the row of pixels). In a belt-shaped area (area between a pair of gate bus lines, for example) that includes a pair of gate bus lines disposed in this manner, TFT as switching elements, contact holes for connecting the TFTs with the respective pixel electrodes, and the like can be disposed. Furthermore, by integrally covering the TFTs and the contact holes with a black matrix, the aperture ratio can be increased compared to providing a gate bus line and a TFT in the vicinity of a pixel.

Here, the area that should be shielded from light is described. First, the area where the TFTs are disposed is one example of an area that should be shielded from light. If light is radiated through the channel portion of a TFT, a change in characteristics occur (change in leakage current in an OFF state, for example). In particular, if a display device is used outdoors, external light can enter from a diagonal direction with ease. Therefore, it is preferable that the light-shielding region that covers the TFTs be large.

Furthermore, it is preferable that the area where the contact hole is formed and the peripheries thereof be shielded from light as well. At the contact hole and the peripheries thereof, orientation disorder of liquid crystal tends to occur, because light leakage that leads to degradation of contrast ratio occurs easily.

Furthermore, in the liquid crystal display device, a protruding structure is occasionally provided either as a columnar spacer for maintaining a cell gap (thickness of the liquid crystal layer), or as an orientation regulation member for liquid crystal molecules. The periphery of the protruding structure also tends to have orientation disorder of liquid crystals. Therefore, it is preferable that this periphery also be shielded from light.

In this manner, a liquid crystal display device has a plurality of areas that should be shielded from light. According to the configuration of one embodiment of the present invention, two gate bus lines that are formed of a non-transparent conductive material are typically provided so as to overlap pixel electrodes, and TFTs and contact holes disposed in the vicinity thereof are integrally shielded from light by a black matrix. In this case, a gate bus line is provided at a boundary of a pixel, and thus the aperture ratio can be improved as compared to a configuration in which the TFT and the contact hole are shielded from light separately.

Furthermore, if the protruding structure is being provided, a configuration in which the protruding structure is disposed in an area between two gate bus lines (where TFTs and contact holes are formed) can be adopted, and thus there is no need to form a separate light-shielding region for the protruding structure. Therefore, by providing a protruding structure, the reduction of pixel aperture ratio can be prevented. Thus, in the CPA mode, the MVA mode, and the like, if a protruding structure is formed in the center portion of a pixel as an orientation regulation member or a columnar spacer, the configuration mentioned above is advantageous.

In addition, in a liquid crystal display device that is configured in this manner according to one embodiment of the present invention, an auxiliary capacitance may be formed with an electrode (auxiliary capacitance electrode) disposed directly below a pixel electrode with an insulating layer therebetween. In this case, an auxiliary capacitance can be obtained with an auxiliary capacitance electrode and a pixel electrode, and thus it is not necessary to provide electrodes and wiring lines to form an auxiliary capacitance in the same layer as a gate bus line.

This auxiliary capacitance electrode has an electrode portion (capacitance forming portion) in the area near the two gate bus lines (area between the two gate bus lines, for example), and may have an opening (or area where auxiliary capacitance electrode does not exist) in an area towards the outside of the capacitance forming portion corresponding to a pixel electrode. In this configuration, the auxiliary capacitance electrode may be formed with a non-transparent electrode material with a relatively high conductivity such as molybdenum, and even if the auxiliary capacitance electrode is non-transparent, a reduction of the aperture ratio does not occur. Signal rounding can be prevented by using a material with relatively high conductivity compared to when ITO, IZO, or the like that is a transparent electrode with relatively low conductivity is used.

A configuration with a TFT, a contact hole, and a protruding structure disposed adjacent to each other in a liquid crystal display device in the CPA mode or the like is disclosed in WO 2012/147722 by the applicant of the present invention. However, the liquid crystal display device disclosed in WO 2012/147722 is different from the liquid crystal display device of the present invention in that only one gate bus line is provided for a line of pixels. Therefore, there are more data bus lines therein compared to the liquid crystal display device of the present invention adopting the dual scan line method. All the content disclosed in WO 2012/147722 is incorporated by reference in the present specification.

Embodiments of the present invention are described below with reference to figures, but the present invention is not limited to these embodiments.

Embodiment 1

Figure 2:
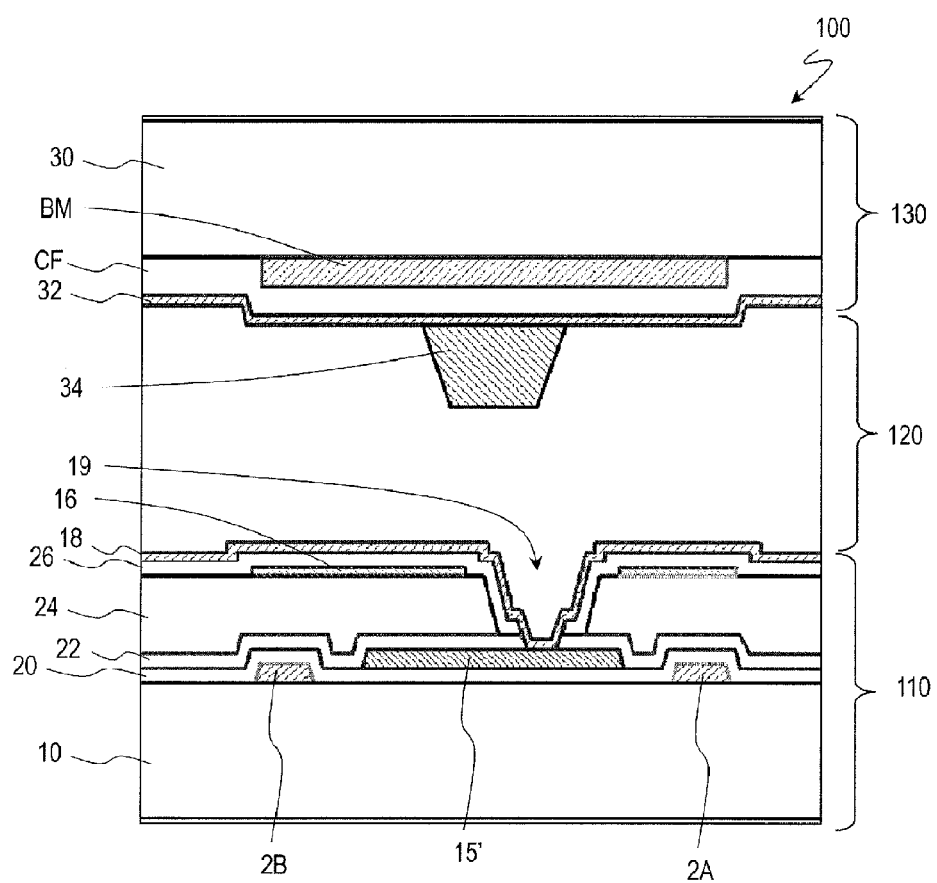
FIG. 2 is a cross-sectional view showing a cross-section along the line A-A in FIG. 1.
Figure 3:
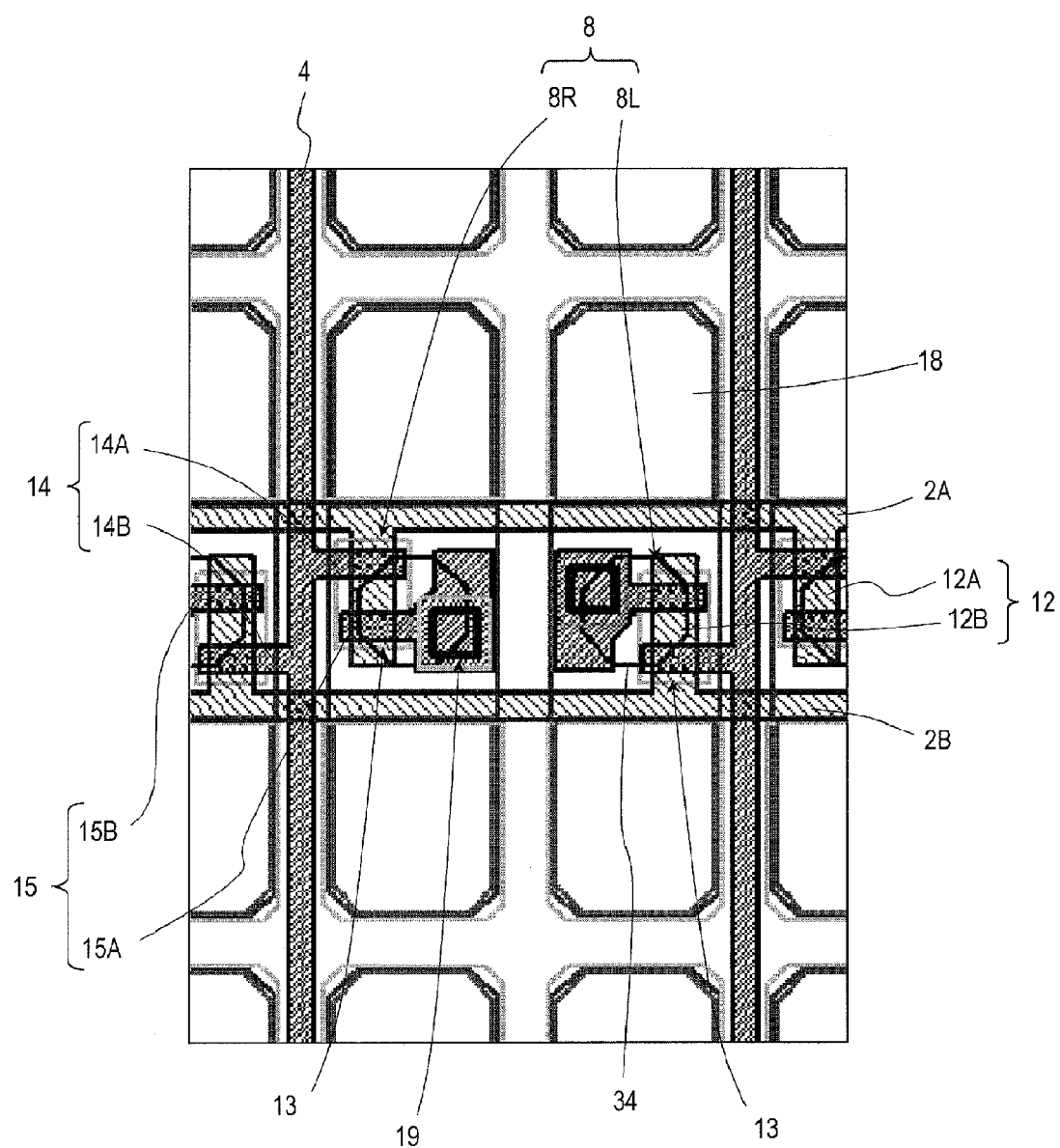
FIG. 3 is an enlarged plan view showing two pixels that are disposed between two data bus lines in FIG. 1.

FIGS. 1 to 3 show a configuration of a liquid crystal display device 100 related to Embodiment 1. The liquid crystal display device 100 is a transmissive liquid crystal display device that performs display by modulating light from a backlight (not shown), and performs display in CPA mode. FIG. 1 is a plan view showing the main configuration of a TFT substrate 110, and FIG. 2 is a cross-sectional view along the line A-A in FIG. 1. Furthermore, FIG. 3 shows an enlarged view of two pixel areas between two data bus lines 4 that are adjacent to each other in the liquid crystal display device 100 shown in FIG. 1.

As shown in FIG. 2, the liquid crystal display device 100 is formed of the TFT substrate 110, an opposite substrate 130, and a liquid crystal layer 120 disposed therebetween. The liquid crystal layer 120 is formed with a liquid crystal material having a negative dielectric anisotropy (Δ∈<0).

Liquid crystal molecules of the liquid crystal layer 120 are oriented such that the liquid crystal molecules have a pre-tilt angle close to 90° (more than or equal to 85° and less than 90° when a voltage is not applied, for example) due to a pair of vertical alignment films (not shown) provided so as to come into contact with the liquid crystal layer 120 on the TFT substrate 110 and the opposite substrate 130. Here, the pre-tilt angle is the angle in the long axis direction of the liquid crystal molecules with respect to the main surface of the substrate.

By using the liquid crystal layer 120 that is a vertical alignment type obtained in this manner and the polarizing plates (not shown) that are respectively disposed in a crossed Nicols state on the outside of the TFT substrate 110 and the opposite substrate 130, a normally black mode can be realized. There are cases in which a ¼λ plate (quarter wave plate) is disposed between the respective polarizing plates and the respective liquid crystal layers 120.

As shown in FIGS. 1 to 3, the TFT substrate 110 has a transparent substrate 10 formed of glass or the like, a gate bus line 2 (2A, 2B) formed on the transparent substrate 10 and a gate electrode 12, a gate insulating film 20 covering these, a data bus line 4 and a source electrode 14 formed on the gate insulating film 20, a drain electrode 15 provided adjacent to the source electrode 14 with a gap therebetween, and the like.

The gate bus line 2 and the data bus line 4 extend toward different directions (horizontal direction and vertical direction in this embodiment), and a TFT 8 is formed near the intersection of the two.

The TFT 8 is formed of the gate electrode 12, the source electrode 14, the drain electrode 15, and the like. The source electrode 14 and the drain electrode 15 are connected to a semiconductor layer 13 disposed over the gate electrode 12 with a gate insulating film 20 therebetween. When a TFT 8 is in an ON state by applying an ON voltage to the gate electrode 12, the source electrode 14 and the drain electrode 15 are electrically connected through the semiconductor layer 13.

In the TFT substrate 110 of the present embodiment, two gate bus lines, or a first gate bus line 2A and a second gate bus line 2B, are provided for a group of pixels PR (hereinafter, also referred to as row of pixels) aligned in the horizontal direction (or, in the direction that the gate bus line 2 extends). The first gate bus line 2A and the second gate bus line 2B are parallel to each other and are disposed so as to be adjacent to each other. In the present specification, if a gap between two gate bus lines is smaller than a gap between one of the gate bus lines and another gate bus line, then the aforementioned two gate bus lines are occasionally referred to as "adjacent gate bus lines."

The adjacent first and second gate bus lines 2A and 2B are both disposed so as to cross the center of the row of pixels PR. Needless to say, the respective first and second gate bus lines 2A and 2B may be disposed so as to extend from a position offset from the center line of the row of pixels PR. However, it is preferable that the center line of the gate bus line that is right in the middle of the first gate bus line 2A and the second gate bus line 2B and the center line of the row of pixels PR match.

Furthermore, in the present embodiment, each pixel has a vertically-long shape (25 μm×75 μm (W×L), for example), and the pair of gate bus lines 2A and 2B extends so as to cross the pixels. The configuration of the present embodiment can be suitably applied if the pixel has a shape in which the aspect ratio (ratio of the length of the horizontal direction of the pixel [the direction in which the gate bus line extends] to the length of the vertical direction thereof, or, the vertical direction in which the gate bus line extends) is large. By disposing two gate bus lines so as to cross a center portion of a longer side of a pixel with a relatively narrow shape, the areas that need to be shielded from light can be shielded together more easily. However, the pixel does not need to have a narrow shape and it is preferable that the aspect ratio thereof be greater than or equal to one.

Meanwhile, the data bus line 4 extends in the vertical direction and is disposed at an end (gap between adjacent pixel electrodes 18) of the line of pixels PC aligned in the vertical direction (hereinafter, column of pixels). Furthermore, in the liquid crystal display device 100, the data bus line 4 is provided adjacent to two pixels PXL and PXR aligned along the horizontal direction so as to sandwich the data bus line 4. In this configuration, the data bus line 4 is disposed at a ratio of two pixels to one data bus line for one row of pixels PR. In other words, one data bus line 4 is provided for every two columns of pixels PC, and the number of data bus lines is halved compared to a conventional configuration with one data bus line 4 for each column of pixels PC.

In the present configuration, a TFT 8R and a TFT 8L located on the right side and the left side of the data bus line 4 are respectively provided for each pixel PXR and PXL located on the right side and the left side of the data bus line 4, and these TFTs 8R and 8L are connected to the first gate bus line 2A and the second gate bus line 2B, respectively.

Here, the TFT 8R on the right side is configured so as to include a gate electrode 12A that is formed so as to branch out from the first gate bus line 2A towards the bottom (center portion of the pixel), a source electrode 14A that is formed so as to branch out from the data bus line 4 towards the right (center portion of the pixel), a drain electrode 15A corresponding to the source electrode 14A, and a semiconductor layer 13. Furthermore, the TFT 8L on the left side is configured so as to include a gate electrode 12B that is formed so as to branch out from the second gate bus line 2B towards the top (center portion of the pixel), a source electrode 14B that is formed so as to branch out from the data bus line 4 towards the left (center portion of the pixel), a drain electrode 15B corresponding to the source electrode 14A, and a semiconductor layer 13.

In this manner, different gate bus lines 2A and 2B are each connected to respective TFTs 8R and 8L that are connected to the same data bus line 4, and thus the ON state and OFF state of these two TFTs 8R and 8L can be controlled independently. Therefore, even if a common data bus line 4 is used, a data signal can be inputted to the two TFTs 8R and 8L (or, two pixels PXR and PXL) independently.

Furthermore, as shown in FIG. 2, a passivation film (SiNx film, for example) 22 that covers the TFT 8 and the planarizing film (photosensitive organic film, for example) 24 on the passivation film 22 is formed over the TFT 8. Occasionally, the passivation film 22 and the planarizing film 24 are together called a first insulating layer.

Over the first insulating layer 22 and 24, an auxiliary capacitance electrode 16 formed of a transparent or non-transparent conductive material is provided. The auxiliary capacitance electrode 16 is covered by a second insulating layer (SiNx film, for example) 26, and the pixel electrode 18 is formed over the second insulating layer 26. The pixel electrode 18 is formed with a transparent conductive material such as ITO or IZO.

The pixel electrode 18 and the auxiliary capacitance electrode 16 are insulated, and an auxiliary capacitance (storage capacitance) is formed by the pixel electrode 18, the auxiliary capacitance electrode 16, and the second insulating layer 26. Furthermore, the auxiliary capacitance electrode 16, an electrode portion (auxiliary capacitance opposite electrode) of a drain connection part 15' mentioned later, and the first insulating layers 22 and 24 sandwiched therebetween also form an auxiliary capacitance.

As mentioned above, over the pixel electrode 18, a vertical alignment film (not shown) that is in contact with the liquid crystal layer 120 is formed. The vertical alignment film controls the orientation of the liquid crystal molecules in the liquid crystal layer 120 such that the orientation of the long axes thereof are substantially perpendicular to the substrate surface when voltage is not applied.

The drain electrode 15 of the TFT 8 is connected to the pixel electrode 18 at the drain connection part 15' through the contact hole 19. The contact hole 19 is provided so as to penetrate the first insulating layers 22 and 24, an opening 16H (see FIG. 4(b)) of the auxiliary capacitance electrode 16, and the second insulating layer 26. The pixel electrode 18 is connected to the drain connection part 15' that is exposed at the bottom surface of the contact hole 19. Furthermore, the contact hole 19 is formed so as to pass through the opening 16H of the auxiliary capacitance electrode 16, and thus the auxiliary capacitance electrode 16, the pixel electrode 18, and the TFT 8 (drain electrode 15) are electrically insulated.

An opposite substrate 130 is usually disposed towards the viewer's side so as to face the TFT substrate 110 described above. The opposite substrate 130 is a transparent substrate 30 formed of glass or the like. A black matrix BM that is a light-shielding member, a color filter CF, an opposite electrode 32 formed of a transparent conductive material, and the like are provided on the transparent substrate 30. Furthermore, a vertical alignment film (not shown) is provided so as to be in contact with the liquid crystal layer 120. The black matrix BM is formed of a black resin or a metal film, for example.

Furthermore, in order to operate in CPA mode, a protruding structure 34 is provided on the opposite substrate 130 for orientation control. The protruding structure 34 is provided in the center portion of each pixel and the liquid crystal molecules of the liquid crystal layer 120 are oriented around the protruding structure 34 in a radial manner when voltage is being applied. In this manner, by using the protruding structure 34 as a structure that controls orientation, operation in CPA mode in which the liquid crystal molecules corresponding to the respective pixels are oriented in a radial manner when voltage is applied becomes possible, and thus the viewing angle characteristics can be improved.

The tip of the protruding structure 34 shown in the drawing is located in the liquid crystal layer 120, and the protruding structure 34 does not come into contact with the TFT substrate 110. However, to use the protruding structure 34 as a columnar spacer to maintain the cell gap (thickness of the liquid crystal layer 120), the protruding structure 34 may be configured to have a height in which the tip portion thereof comes into contact with the TFT substrate 110 or be configured to have a height in which a small gap exists. The protruding structure 34 (also called a rivet) provided to control orientation has a height of 0.7 µm, for example, and the protruding structure 34 provided as a columnar spacer has a height of 3.2 µm, for example.

The height of the protruding structure 34 provided as a columnar spacer may have a plurality of types. A shorter spacer (sub columnar spacer: 2.7 µm in height, for example) only functions so as to maintain the cell gap if there is pressure from outside, and the shorter spacer can be suitably used for a liquid crystal display device with a touch panel or the like to maintain the cell thickness. Furthermore, by providing a sub columnar spacer that is shorter (or that has less volume), the generation of vacuum bubbles in the cell caused by the difference in the shrinkage factor between the liquid crystal layer and the spacer when temperature changes can be reduced.

In this manner, in the present embodiment, the protruding structure 34 may be provided to control orientation, or be provided as a spacer. Of course, the protruding structure 34 may have both functions. The protruding structure 34 can be used as a spacer, so the size of the contact hole 19 should be a size in which the protruding structure 34 does not fall therein.

The cross-sectional shape of the protruding structure 34 (a projection to the substrate surface in the direction normal to the substrate) may be a regular octagon, other polygons, a circle, an oval, or the like. It is preferable that the protruding structure 34 be a truncated shape, and the area of the lower bottom surface (opposite substrate 130 side) be smaller than the upper bottom surface (TFT substrate 110 side). In other words, it is preferable that the angle of the surface of the opposite substrate 130 to the side face of the protruding structure 34 be smaller than 90 degrees.

Furthermore, it is preferable that the permittivity of the columnar spacer or the rivet (protruding structure 34) be smaller than the permittivity of the liquid crystal material forming the liquid crystal layer 120. This is done so that the slope aspect of the liquid crystal molecules that is prompted by the shape of the side faces of the columnar spacer or the rivet does not become opposite to the direction that the electric field is making the liquid crystals incline towards.

Below, the configuration of the liquid crystal display device 100 is further described with reference to FIGS. 4(a) to 4(c).

Figure 4:
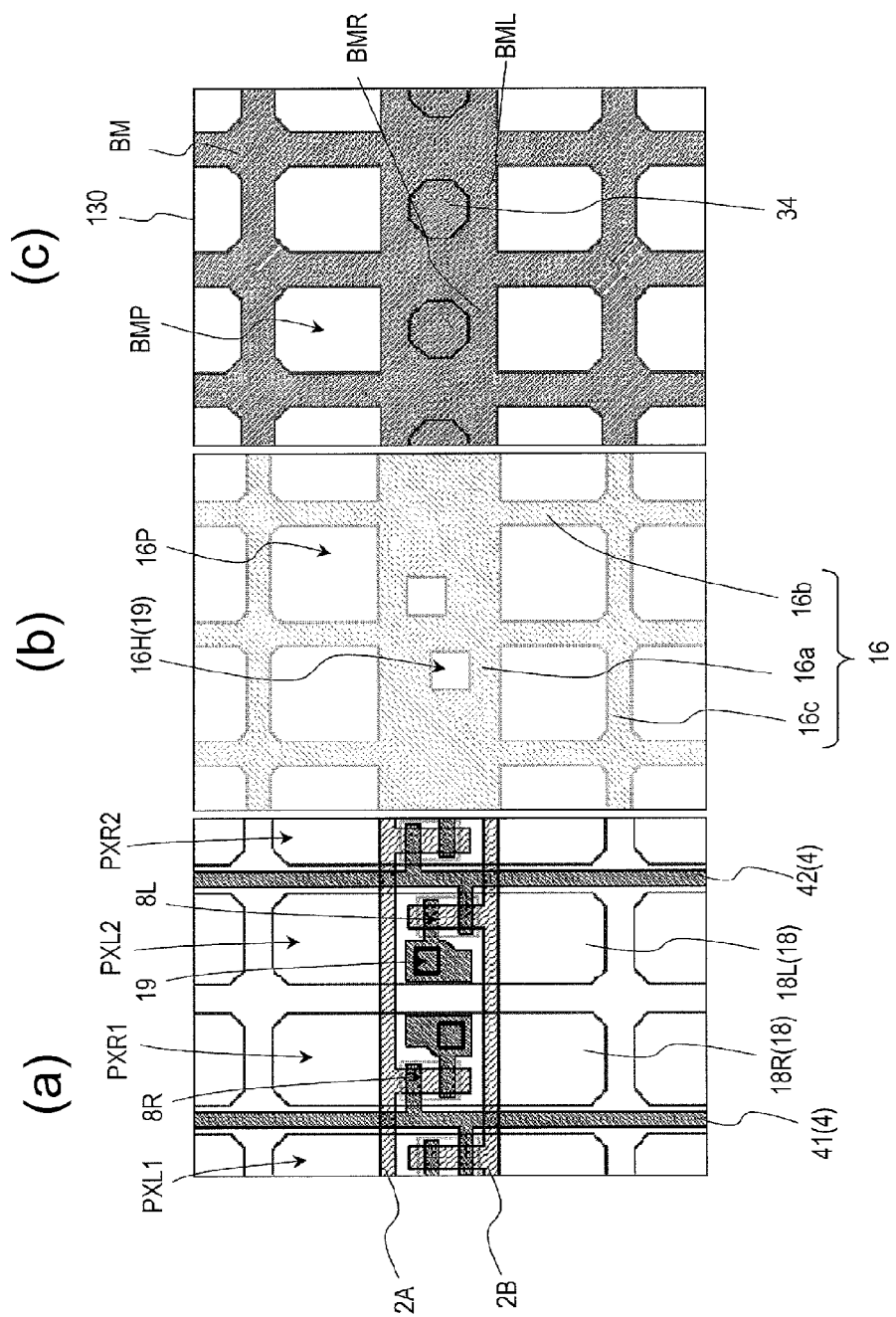

FIG. 4(a) shows where the TFT 8 (8R, 8L), the contact hole 19, and the pixel electrode 18 (18R, 18L) are disposed on the TFT substrate 110. Here, two pixels sandwiched by the data bus lines 4 that are provided for every two pixels are shown. More specifically, FIG. 4(a) mainly shows a right side pixel PXR1 of the left and right pixels PXL1 and PXR1 connected to the data bus line 41 on the left side of the figure, and a left side pixel PXL2 of the left and right pixels PXL2 and PXR2 that are connected to the data bus line 42 on the right side. However, the left side pixel PXL2 that is connected to the data bus line 42 on the right side has virtually the same configuration as the left side pixel PXL1 that is connected to the left side data bus line 41. Thus, needless to say, the description of the left side pixel PXL2 provided below is also true for other left side pixels PXL1.

As shown in FIG. 4(a), in the present embodiment, the TFT 8R connected to the first gate bus line 2A and the pixel electrode 18R are connected through the contact hole 19 in the right side pixel PXR1 that is connected to the data bus line 41 on the left side. Furthermore, the TFT 8L that is connected to the second gate bus line 2B and the pixel electrode 18L are connected through the contact hole 19 in the left side pixel PXL2 connected to the data bus line 42 on the right side.

All of the TFTs 8R and 8L are disposed between the two gate bus lines 2A and 2B that are adjacent to each other. Furthermore, the contact hole 19 for connecting the TFTs 8R and 8L with the respective pixel electrodes 18R and 18L are disposed so as to be sandwiched between the two gate bus lines 2A and 2B that are adjacent to each other.

As mentioned above, the two gate bus lines 2A and 2B that are adjacent to each other extend so as to cross the center portion of the row of pixels, and thus the TFTs 8R and 8L and the contact hole 19 that are sandwiched by the two gate bus lines 2A and 2B are disposed so as to be adjacent to the center portion of the row of pixels PR. Therefore, as shown in FIG. 4(c), the total area of light shielding can be reduced if the TFTs 8R and 8L and the contact hole 19 are integrally shielded by the black matrix BM formed on the opposite substrate 130 instead of shielding TFTs and contact holes provided in separate locations. Due to this, the black matrix BM has a central light shielding portion BMR that integrally covers the TFT 8R and the contact hole 19 in the center portion of the right side pixel PXR1, and a central light shielding portion BML that integrally covers the TFT 8L and the contact hole 19 in the center portion of the left side pixel PXL2.

Furthermore, as shown in FIG. 4(c), the liquid crystal display device 100 has a protruding structure 34 that is an orientation control member, a columnar spacer, or both provided in the center portion of the pixel. The area in which the protruding structure 34 has been provided also tends to have orientation disorder, and is an area that tends to have degradation of contrast ratio. If the black matrix BM has a light-shielding portion that shields the TFT 8 and the contact hole 19 at the center portion of a pixel as in the liquid crystal display device 100, then there is no need to provide a separate light-shielding portion for the protruding structure 34, and thus the pixel aperture ratio can be improved.

In this configuration, as shown in FIG. 3 and the like, when seen from the direction normal to the TFT substrate 110, the protruding structure 34 is disposed such that the TFT 8 and the contact hole 19 at least partially overlap. In this manner, the protruding structure 34, the TFT 8, and the contact hole 19 are disposed so as to be adjacent, and by integrally covering these with the central light-shielding portions BMR or BML of the black matrix BM, the aperture ratio can be improved.

Furthermore, the black matrix BM may be formed so as to integrally cover the two TFTs 8R and 8L that are sandwiched by two data bus lines that are adjacent to each other and the two contact holes 19 (or, such that the central light-shielding portion BMR and the central light shielding portion BML are continuous). In the present embodiment, each of the areas that should be shielded from light in the respective plurality of pixels are concentrated in a belt-shaped area that passes through the center portion of each pixel. Therefore, the black matrix BM can integrally cover these with ease. The black matrix BM does not have to only cover these two TFTs 8R and 8L and the two contact holes 19, but as shown in FIG. 4(c), the black matrix BM may have a belt-shaped light-shielding portion that integrally covers a plurality of TFTs 8 and contact holes 19 that are disposed in the area (center portion of a row of pixels) sandwiched by the two adjacent gate bus lines 2A and 2B. However, outside the belt-shaped light-shielding region, the black matrix BM is provided with an opening BMP at a location corresponding to the pixel electrode 18.

The black matrix BM shown in FIG. 4(c) has a light-shielding portion that covers the data bus line 4. This light-shielding portion is there to avoid mixed colors from occurring when there is a deviation in position when the TFT substrate 110 and the opposite substrate 120 are bonded. Furthermore, the response speed of the liquid crystal molecules in areas that are far from the protruding structure 34 (periphery of a pixel) tends to be slow, and tends to cause residual images. The occurrence of residual images can be suppressed by shielding the periphery area of a pixel from light with the light-shielding portion.

Next, the configuration of the auxiliary capacitance electrode 16 will be described with reference to FIG. 4(b) and the like.

The auxiliary capacitance electrode 16 has a main capacitance forming portion 16a for forming an auxiliary capacitance between the auxiliary capacitance electrode 16 and the pixel electrode 18 in the center portion of a pixel (or, the area where the TFT 8 and the contact hole 19 are provided that needs to be shielded from light). The main capacitance forming portion 16a can also form an auxiliary capacitance between the auxiliary capacitance electrode 16 and the electrode portion near the drain connection part 15'.

Furthermore, in the auxiliary capacitance electrode 16, an opening 16H for the contact hole is provided at a location corresponding to the contact hole 19. Due to this, the auxiliary capacitance electrode 16 and the pixel electrode 18 can be insulated. Furthermore, the pixel opening 16P is provided towards the outside of the main capacitance forming portion 16a, in the area corresponding to the pixel electrode 18. In other words, the auxiliary capacitance electrode 16 has a shape that overlaps with only a portion of the pixel electrode 18.

In this manner, if the auxiliary capacitance electrode 16 has the main capacitance forming portion 16a that has a shape corresponding to the area that should be shielded from light (area that is covered by BM) and a pixel opening 16P outside the main capacitance forming portion 16a, then even if the auxiliary capacitance electrode 16 is formed of a metal with light-shielding characteristics, hardly any reduction of the pixel aperture ratio occurs. Therefore, the auxiliary capacitance electrode 16 does not need to be formed of a transparent electrode material such as ITO or IZO.

As a result, the auxiliary capacitance electrode 16 can be formed of a metal that has relatively high conductivity and that is non-transparent such as molybdenum (Mo), copper (Cu), aluminum (Al), titanium (Ti), tungsten (W), silver (Ag), or an alloy of these metals. Furthermore, the auxiliary capacitance electrode 16 may be formed by layering these metal films. Specifically, a multilayer film of Mo (80 nm in thickness)/Al (20 nm in thickness) or a single layer film of Mo (100 nm in thickness) can be used. The sum of the film thickness is set to be between 20 nm and 450 nm, for example.

Furthermore, the auxiliary capacitance electrode 16 may be formed by layering a metal film and a transparent conductive film. In this case, Mo, Cu, Al, Ti, W, Ag, or the like, or an alloy of these metals can be used as a metal film, and ITO, IZO, or the like can be used as a transparent electrode. Specifically, a multilayer film of Mo (20 nm in thickness)/ITO (50 nm in thickness) can be used, for example.

If the auxiliary capacitance electrode 16 is formed by stacking the metal film (non-transparent conductive film) and the transparent conductive film, then the metal film may be patterned to have a shape with the opening 16P as shown in FIG. 4(b), and the transparent conductive film may be formed so as to spread across the entire pixel (or the entire display region).

As described above, in the liquid crystal display device 100 of the present embodiment, the auxiliary capacitance electrode 16 that is non-transparent and formed of an electrode material with high conductivity can be formed, and thus signal rounding when a voltage is applied to the auxiliary capacitance electrode 16 can be suppressed across the display region. In particular, when the display region is large, the auxiliary capacitance electrode 16 having high conductivity is advantageous in preventing signal rounding.

Recently, a driving method in which the same voltage applied to the opposite electrode 32 is applied to the auxiliary capacitance electrode 16 for each row of pixels after changing the polarity, for example, is being widely used. If the voltage applied to the auxiliary capacitance electrode 16 varies often in this manner, it is preferable that the auxiliary capacitance electrode 16 be formed of an electrode material with high electrical conductivity.

The main capacitance forming portion 16a may be formed so as to overlap the two gate bus lines 2 in the center of the pixel. In this case, the main capacitance forming portion 16a exists between the gate bus line 2 and the pixel electrode 18. As a result, the electric field between the pixel electrode 18 and the gate bus line 2 can be shielded. Therefore, the parasitic capacitance that may occur between the gate bus line 2 and the pixel electrode 18 may be reduced.

Furthermore, the auxiliary capacitance electrode 16 may have a vertical connecting part 16b that extends vertically and a horizontal connecting part 16c that extends horizontally. A portion of the vertical connecting part 16b is disposed to overlap the data bus line 4 so that the electric field between the pixel electrode 18 and the data bus line 4 can be shielded. As a result, the parasitic capacitance that can form between the data bus line 4 and the pixel electrode 18 can be reduced. Furthermore, by providing a horizontal connecting part 16c, the area of the auxiliary capacitance electrode 16 can be increased and the conductivity thereof can be improved. However, it is possible to omit the vertical connecting part 16b and the horizontal connecting part 16c.

Below, a configuration of the TFT substrate 110 and the frame region R2 is described.

Figure 5:
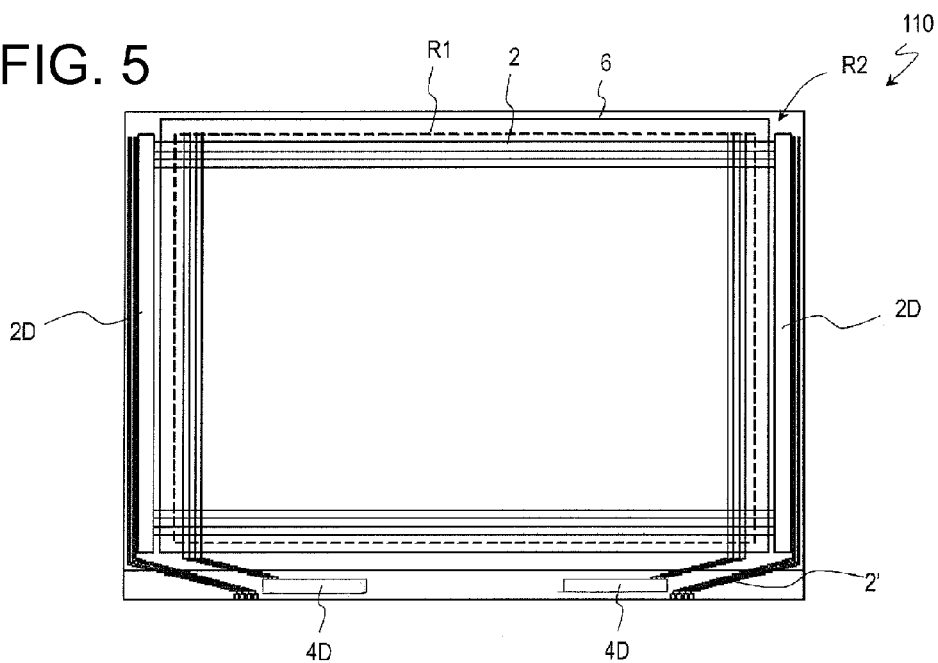

FIG. 5 shows the display region (pixel arrangement region) R1 and the non-display region (frame region) R2 that is provided outside of the display region R1 on the TFT substrate 110. The frame region R2 is provided with a data driver 4D connected to the data bus line 4 and a gate driver 2D that is connected to the gate bus line 2.

In the TFT substrate 110, at the frame region R2 located at the left and right sides of the TFT substrate 110, the gate driver 2D is formed directly (monolithically) on the TFT substrate 110. The circuit that is the gate driver 2D can be formed using the steps of forming the gate bus line 2, the data bus line 4, the semiconductor layer 13 of the TFT 8, the first/second insulating layer, or the like, without adding steps. The gate driver 2D formed in this manner is connected to a gate driver driving signal wiring line 2' and is driven through a terminal portion by a driving device provided outside of the TFT substrate.

Furthermore, the frame region R2 located on the bottom side of the TFT substrate 110 is provided with the data driver 4D. The data driver 4D is formed with an IC chip or the like and is mounted on the TFT substrate 110, for example. As mentioned above, the number of data bus lines 4 of the TFT substrate 110 is half compared to a configuration of a conventional TFT substrate that does not use the dual scan line method. As a result, the number of data drivers 4D, which have a relatively higher cost, can be reduced, and thus a liquid crystal display device can be manufactured at a lower cost.

Furthermore, the frame region R2 of the TFT substrate 110 is provided with an auxiliary capacitance electrode main line 6. The auxiliary capacitance electrode main line 6 is used to supply a prescribed voltage to the auxiliary capacitance electrode 16. This auxiliary capacitance electrode main line 6 may be used to supply voltage to the opposite electrode 32. In other words, the same voltage may be applied to the auxiliary capacitance electrode 16 and the opposite electrode 32 through the auxiliary capacitance electrode main line 6.

Figure 6:
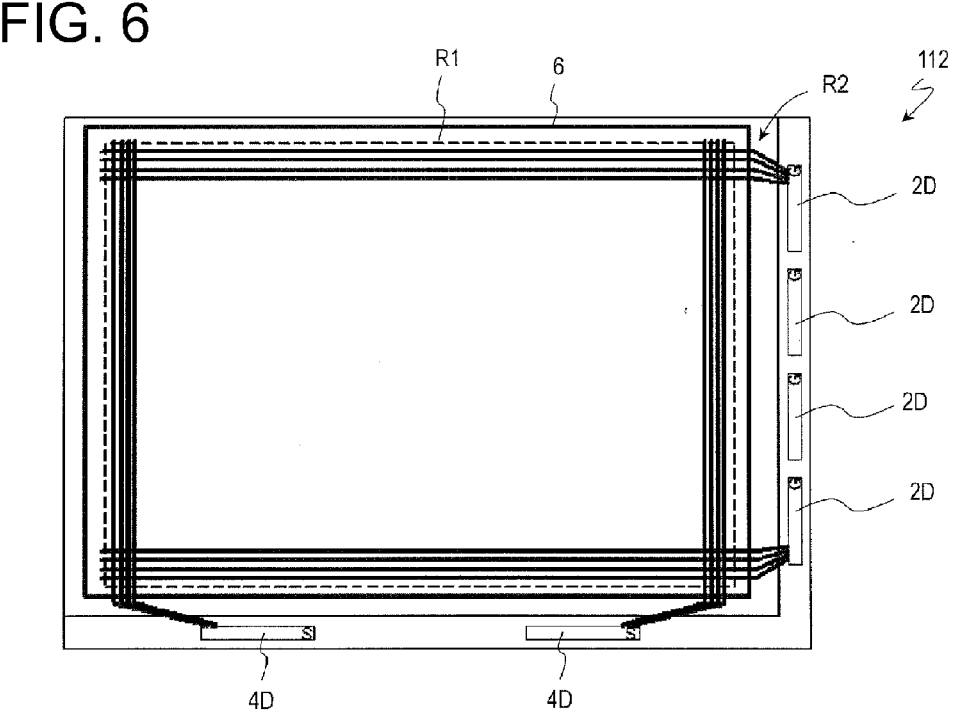
FIG. 6 shows a modification example of the TFT substrate shown in FIG. 5.

FIG. 6 shows a modification example of a TFT substrate 112. As opposed to the TFT substrate 110 shown in FIG. 5, the TFT substrate 112 is provided with the gate driver 2D by mounting an IC chip or the like on the frame region R2 at the right side of the TFT substrate 112. In this manner, an appropriate form can be adopted for the positioning of the gate driver 2D.

Furthermore, as shown in FIG. 1, in the liquid crystal display device 100 of the present embodiment, the position of the contact hole 19 in a pixel differs depending on the pixel, and thus the relative position with the protruding structure 34 located in the center portion of the pixel differs. In this case, advantages described below can be obtained.

There are cases in which the relative position of the protruding structure (columnar spacer) 34 and the contact hole 19 changes from the prescribed position due to position change during the step of bonding the opposite substrate 130 to the TFT substrate 110, or the step of forming the protruding structure 34 that is a columnar spacer on the opposite substrate 130. In this case, if the relative position of the protruding structure 34 and the contact hole 19 is the same in all pixels, then if a position change occurs in a specific direction, the area of the protruding structure 34 in contact with the TFT substrate 110 changes greatly. As a response to this, by having a plurality of forms with different relative positions, when mass production or the like takes place, then even if different degrees of position change occurs during each manufacturing step, fluctuations in the contact area of the protruding structure 34 can be prevented.

In the configuration described above, the light shielded regions with low contribution to display are arranged together in the region in the center of a pixel. As a result, these regions can be shielded from light more efficiently compared to a case in which these regions are dispersed. By arranging these regions to be adjacent to each other, light leakage can be suppressed and the contrast ratio can be improved while improving the aperture ratio of the pixels. In the present embodiment, if the protruding structure 34 for controlling orientation is disposed in the center portion of a pixel to realize CPA mode, a high pixel aperture ratio can be achieved.

Furthermore, by providing the auxiliary capacitance electrode 16 between the TFT 8 and the pixel electrode 18, and by having a portion of the auxiliary capacitance electrode 16 exist between the data bus line 4, the gate bus line 2 and the pixel electrode 18, the electric field generated therebetween can be shielded, and a high display quality with minimal influence from flickering and shadowing can be obtained. Furthermore, by forming the auxiliary capacitance electrode 16 with a metal that is non-transparent and has high conductivity, even if the display region is large, a high display quality can be obtained without lowering the aperture ratio and being affected by flickering and shadowing.

Embodiment 2

Figure 7:
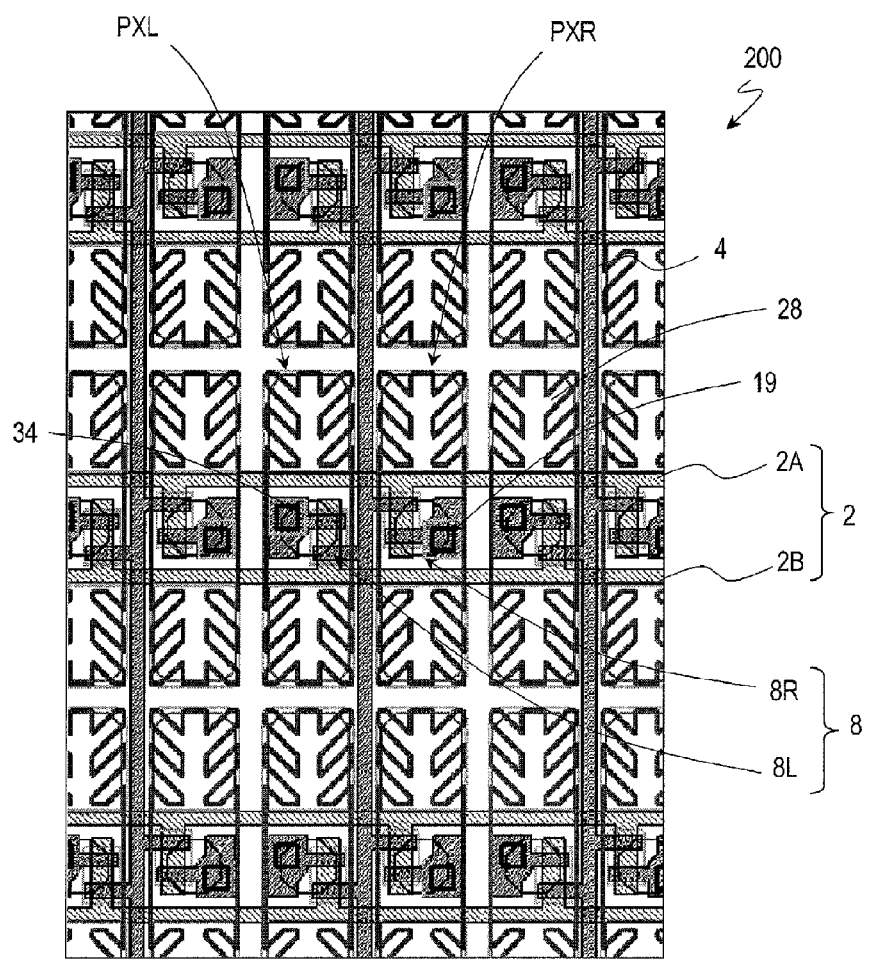
FIG. 7 is a plan view showing a liquid crystal display device according to Embodiment 2 of the present invention.
Figure 8:
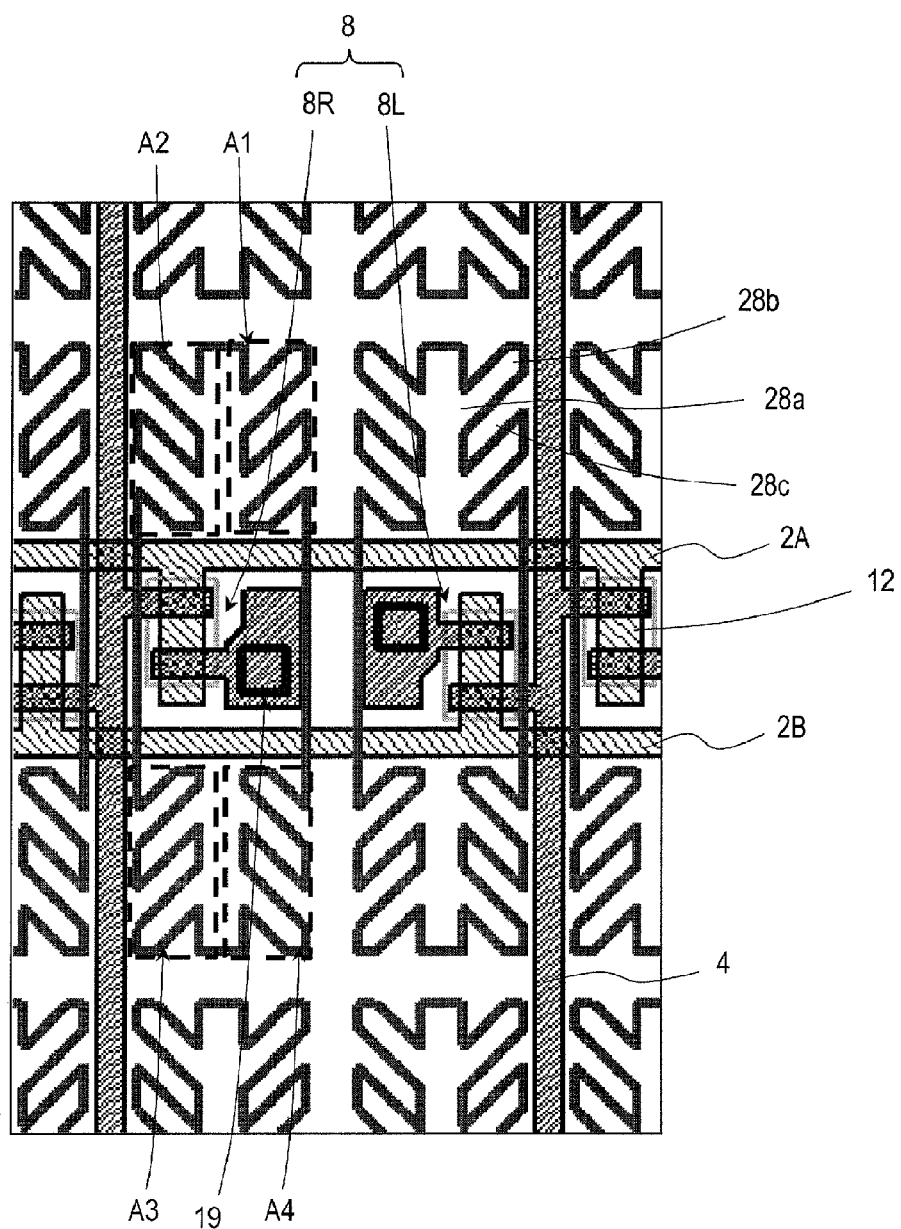
FIG. 8 is an enlarged plan view showing two pixels that are disposed between two data bus lines in FIG. 7.

FIGS. 7 and 8 show a liquid crystal display device 200 of Embodiment 2. The liquid crystal display device 200 of the present embodiment is different from the liquid crystal display device 100 of Embodiment 1 in that the present embodiment uses a fishbone-like pixel electrode 28 as a pixel electrode and that display takes place in the MVA mode. Constituting elements that are shared with Embodiment 1 will be assigned the same reference characters, and duplicate explanations will be avoided.

As shown in FIG. 8, the fishbone-like pixel electrode 28 has a plurality of narrow electrode portions (branch electrodes) that extend in the directions of azimuthal angles 45°, 135°, 225°, and 315°. Between the narrow electrode portions 28b, a narrow cutout (slit) 28c that extends in the corresponding direction is provided. Furthermore, the respective narrow electrode portions 28b are connected to a backbone portion (trunk portion) that extend along the vertical direction (direction in which the data bus line extends).

The direction in which the narrow electrode portion 28b (or the slit 28c) extends differs among the four regions A1 to A4 determined by vertically and horizontally dividing a pixel in four. These four regions A1 to A4 correspond to the four liquid crystal orientation regions (liquid crystal domains) A1 to A4 in a single pixel. The orientation state of the liquid crystal molecules within the respective regions are the same and the orientation state of the liquid crystal molecules differ among different domains.

Specifically, when a voltage is applied between the pixel electrode 28 and the opposite electrode 32 (see FIG. 2), in the respective domains A1 to A4, the liquid crystal molecules are aligned so as to be parallel with the direction in which the slit 28c extends and such that the upper edge portion of the liquid crystal molecules tilt towards the inside of the pixel.

Furthermore, a protruding structure 34 is also provided in the center portion of the pixels in the liquid crystal display device 200. The protruding structure 34 can also be used to control orientation in this MVA mode liquid crystal display device 200. Details are explained below.

The protruding structure 34 is in a regular octagon shape or the like in a plan view with four sides that are substantially perpendicular to the respective orientation direction (azimuthal angles 45°, 135°, 225°, 315°) of the liquid crystal molecules in each domain A1 to A4. Furthermore, the protruding structure 34 has a truncated shape in which the angle of the surface of the opposite substrate 130 to the side face of the protruding structure 34 is smaller than 90 degrees.

Because the vertical alignment film is also formed on the side face of the protruding structure 34, the protruding structure 34 also controls the orientation of the liquid crystal molecules. The direction of the orientation control (direction in which the liquid crystal molecules tilt) is the direction perpendicular to a side face of the protruding structure 34.

The liquid crystal molecules in the domains A1 to A4 surrounding the protruding structure 34 attempts to be horizontally oriented to the protruding structure 34, but because the side face of the protruding structure 34 has a face that is perpendicular to the orientation direction of the liquid crystal molecules, the direction in which the orientation direction is controlled by the protruding structure 34 and the direction in which the orientation direction is controlled by the domains A1 to A4 matches (or the two directions are close). Furthermore, the orientation direction of the boundary region (or the liquid crystal molecules on the backbone portion 28a) of the domains A1 to A4 in which the orientation direction of the liquid crystal molecules is unstable can be directed towards the protruding structure 34. Thus, an orientation disorder is less likely to occur, and a display with excellent transmittance, contrast ratio, or viewing angle characteristics can be obtained.

Furthermore, a high quality display can be provided by preventing transmittance from being different for each domain and the occurrence of roughness or the like. In this manner, when a plurality of domains around the center of the pixel region are determined by the pixel electrode 28, it is suitable to dispose a protruding structure 34 in the center of the pixel region so that orientation disorder is less likely to occur.

It is preferable that the orientation direction of the liquid crystal molecules of the respective domains A1 to A4 have an azimuthal angle of 45° to the polarizing axis of the polarizing plate (the three to nine o'clock direction and twelve to six o'clock direction) disposed on the outside of the liquid crystal panel.

Next, the auxiliary capacitance electrode 16 of the liquid crystal display device 200 is described. In the present embodiment, the auxiliary capacitance electrode 16 has a similar shape to the shape shown in FIG. 4(b), and the auxiliary capacitance is formed of the main capacitance forming portion 16a disposed in the center portion of the pixel and of the center portion of the pixel of the fishbone-like pixel electrode 28. Here, as shown in FIG. 8, the center portion of a pixel of the fishbone-like pixel electrode 28 does not have the slit 28c. Thus, a relatively large (or, similar to the liquid crystal display device 100 in Embodiment 1) auxiliary capacitance can be formed in the center portion of the pixel between the fishbone-like pixel electrode 28 and the main capacitance forming portion 16a of the auxiliary capacitance electrode.

Figure 9:
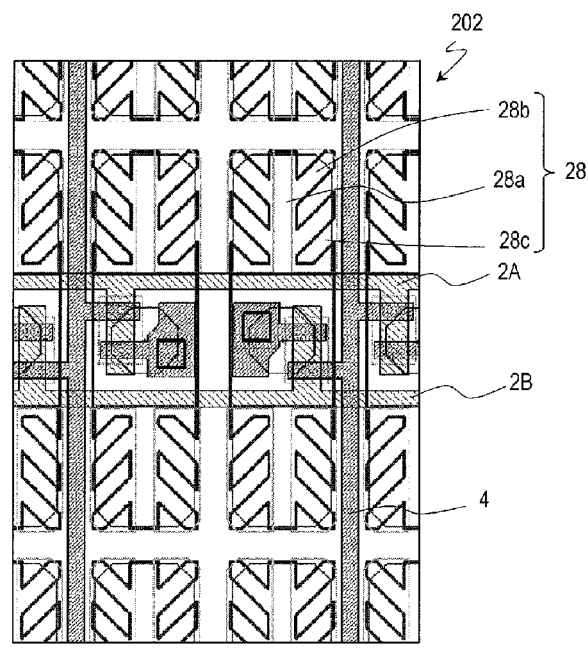
FIG. 9 shows two pixels disposed between two data bus lines of the liquid crystal display device of a modification example of Embodiment 2.
Figure 9:
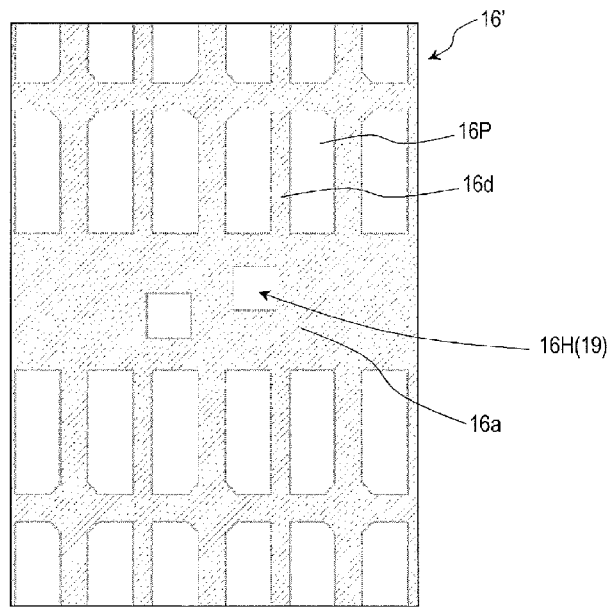

FIGS. 9(a) and 9(b) show a configuration of a liquid crystal display device 202 that is a modification example with a different form of auxiliary capacitance electrode 16' formed so as to correspond to the fishbone-like pixel electrode 28.

The backbone portion 28a of the fishbone-like pixel electrode 28 is positioned at the boundary of the liquid crystal domain A1 to A4, and the liquid crystal molecules disposed on the backbone portion 28a do not contribute much to the display. Thus, as shown in FIG. 9(b), the auxiliary capacitance electrode 16' may be provided with an additional capacitance forming portion 16d provided along the backbone portion 28a so as to overlap (or, so as to pass through the center of the pixel opening 16P) the backbone portion 28a.

The auxiliary capacitance electrode 16' in this modification example of the liquid crystal display device 202 may be formed of a non-transparent metal (molybdenum or the like). This is because the additional capacitance forming portion 16d is disposed below the backbone portion 28a and therefore does not greatly lower the display quality.

By providing the capacitance forming portion 16d below the backbone portion 28a, an additional auxiliary capacitance is formed between the fish bone portions 28a and thus a larger auxiliary capacitance can be secured.

Next, a configuration using PSA (polymer sustained alignment) technology is explained.

PSA technology has an orientation maintaining layer to control the orientation direction of liquid crystal molecules when voltage is not applied. The orientation maintaining layer is typically formed as a polymer layer by photopolymerization of a photopolymerizable monomer that has been mixed into liquid crystal material beforehand, and this photopolymerization typically occurs when voltage is being applied to the liquid crystal layer after the liquid crystal cells have been formed. Depending on the orientation maintaining layer, when a voltage is not applied to the liquid crystals, it is possible to maintain (store) a pre-tilt angle slightly tilted (2° to 3°, for example) from a direction perpendicular to the substrate face and an orientation direction. As a result, the response speed of the liquid crystal orientation when voltage is applied can be improved.

As in the present embodiment, it is preferable that the orientation direction of the liquid crystal molecules prompted by the slit 28c of the pixel electrode 28, and the orientation direction of the liquid crystal molecules prompted by the protruding structure 34 be similar. In this case, when PSA processing takes place, the orientation of the liquid crystal can be maintained at a desired orientation more reliably, and roughness and unevenness in the manufactured liquid crystal display device due to PSA processing can be suppressed. Furthermore, because the response speed can be improved, an orientation anomaly that occurs when a liquid crystal panel surface is pressed by a finger or the like can be returned to the normal orientation quicker. As a result, this is suitable when a touch panel or the like is provided on the surface of the liquid crystal panel.

PSA technology can not only be used together with the fishbone-like pixel electrode 28, but can also be used in the CPA mode liquid crystal display device 100 of Embodiment 1, and can achieve improved response speed.

Embodiment 3

Figure 10:
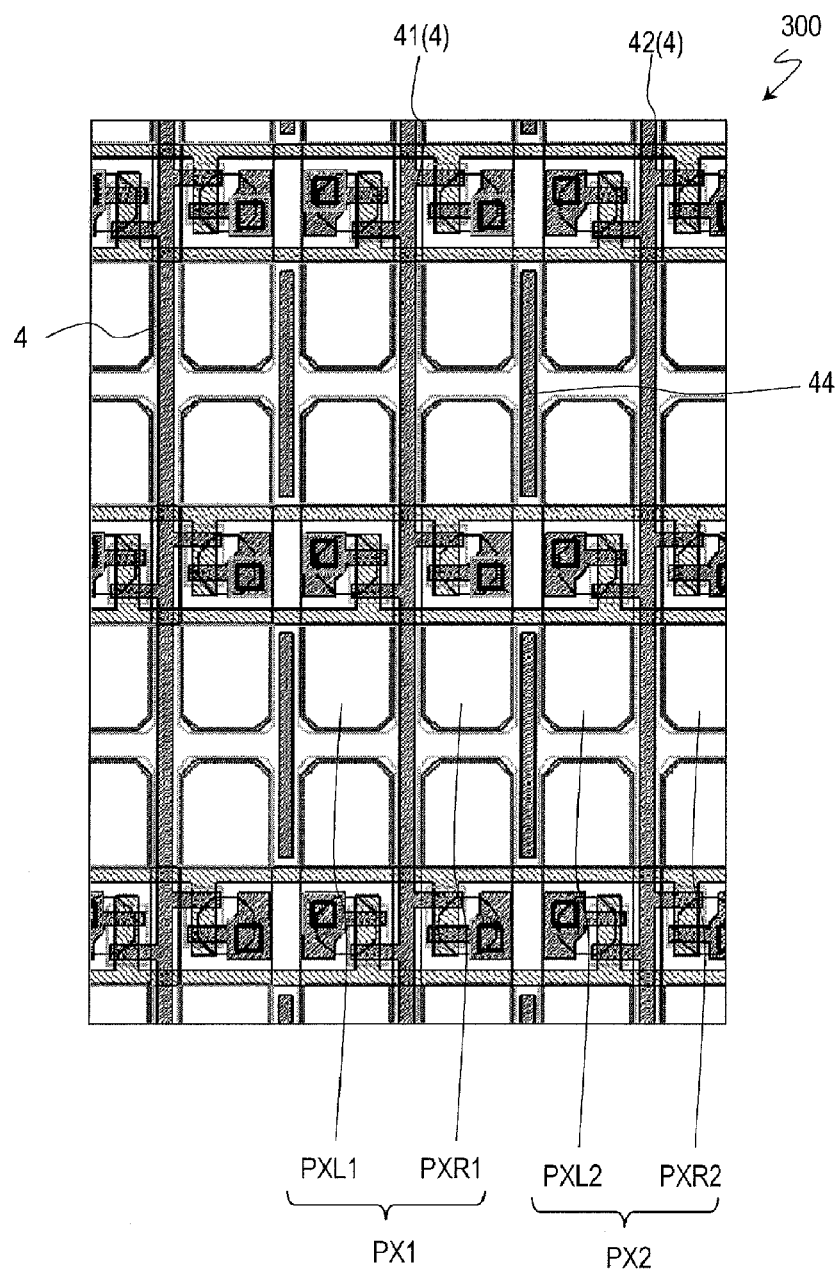
FIG. 10 is a plan view showing a liquid crystal display device according to Embodiment 3 of the present invention.
Figure 11:
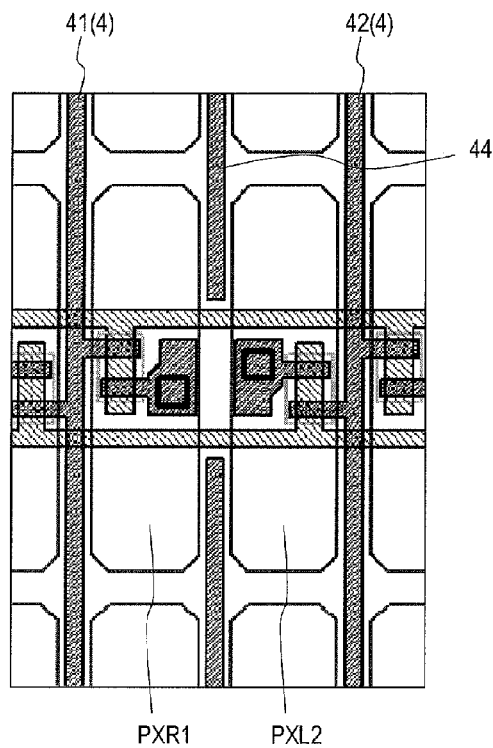
FIG. 11 is an enlarged plan view showing two pixels disposed between two data bus lines in FIG. 10.

FIGS. 10 and 11 show a liquid crystal display device 300 of Embodiment 3. The liquid crystal display device 300 of the present embodiment is different from the liquid crystal display device 100 of Embodiment 1 in that a light-shielding member 44 is provided between two adjacent data bus lines 41 and 42 at a boundary of two pixels PX1 and PX2 that are adjacent to each other in the horizontal direction.

In this manner, typically, by forming the light-shielding member 44 in the same step with the same material as a gate bus line 2 or a data bus line 4 (a light-shielding member formed in this manner is sometimes called a dummy electrode) in portions where there is no data bus line 4, the following advantages can be obtained.

There are cases in which during the photolithography step to form a pixel electrode 18, the pixel electrode 18 deviates greatly towards the right side to the data bus line 4 (or, the pixel electrode of the left side pixel PXL2 deviates so much that it overlaps the data bus line 42), and an opposite substrate 130 (BM) is also bonded with similar deviations. If the light-shielding member 44 does not exist at this point, the pixel electrode of the right side pixel PXR1 and the data bus line 41 do not overlap, so the aperture ratio thereof does not decrease, but the aperture ratio of the left side pixel PXL2 decreases. In order to minimize the difference in aperture ratio between the two pixels PXL1 and PXL2 adjacent to each other in the horizontal direction between adjacent data bus lines 41 and 42, it is preferable that the light-shielding member 44 for adjusting the aperture ratio be provided.

A configuration in which the light-shielding member 44 is provided is especially effective in cases where the auxiliary capacitance electrode 16 is formed of a transparent electrode material (ITO or the like). If the auxiliary capacitance electrode 16 is formed of a non-transparent electrode material, by forming the auxiliary capacitance electrode 16 so as to have a vertical connecting part 16b (see FIG. 4(b)), the vertical connecting part 16b can function similarly to the light-shielding member 44.

The light-shielding member (dummy electrode) 44 described above does not need to be provided so as to be separate from the data bus lines 41 and 42. The data bus lines 41 and 42 and the dummy electrode 44 may be electrically connected through a branched portion of the data bus line that extends in the horizontal direction between two pixels aligned in the vertical direction, for example. However, needless to say, the dummy electrode 44 is only connected to one of the adjacent data bus lines 41 and 42.

Embodiment 4

Figure 12:
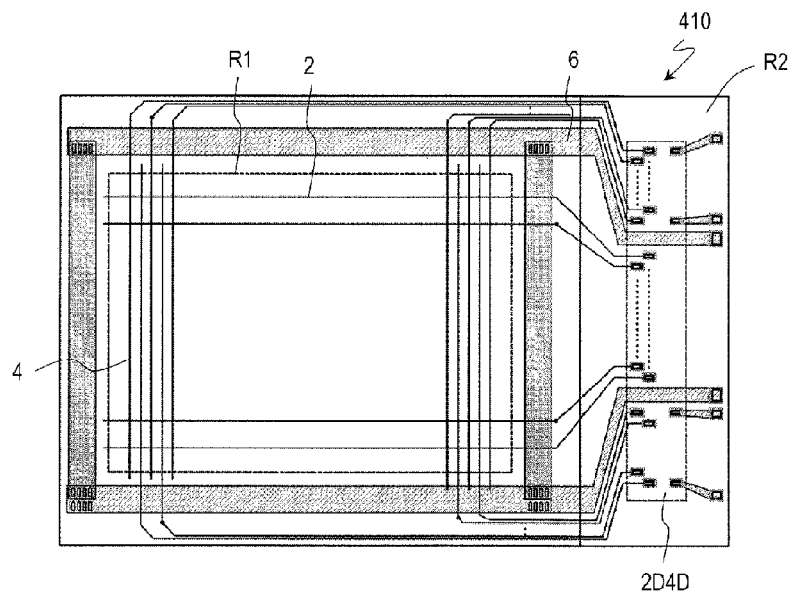
FIG. 12 is a plan view showing a liquid crystal display device according to Embodiment 4 of the present invention.

FIG. 12 shows a TFT substrate 410 provided in a liquid crystal display device of Embodiment 4. The TFT substrate 410 is different from the configuration shown in FIGS. 5 and 6 in that the data driver and the gate driver are integrally formed. This integrated driver 2D4D is disposed on the right side of the TFT substrate 410. In this type of configuration, the width of the other three frame regions of the TFT substrate 410 can be made narrower.

In a configuration in which the integrated driver 2D4D is provided on one side of the TFT substrate 410, an auxiliary capacitance electrode main line 6 may be provided so as to connect to an external circuit of the TFT substrate 410 through a region where the integrated driver 2D4D is mounted. Furthermore, in a case in which the integrated driver 2D4D supplies a signal to the auxiliary capacitance electrode main line 6, the auxiliary capacitance electrode main line 6 and the integrated driver 2D4D may be directly connected.

Embodiment 5

Figure 13:
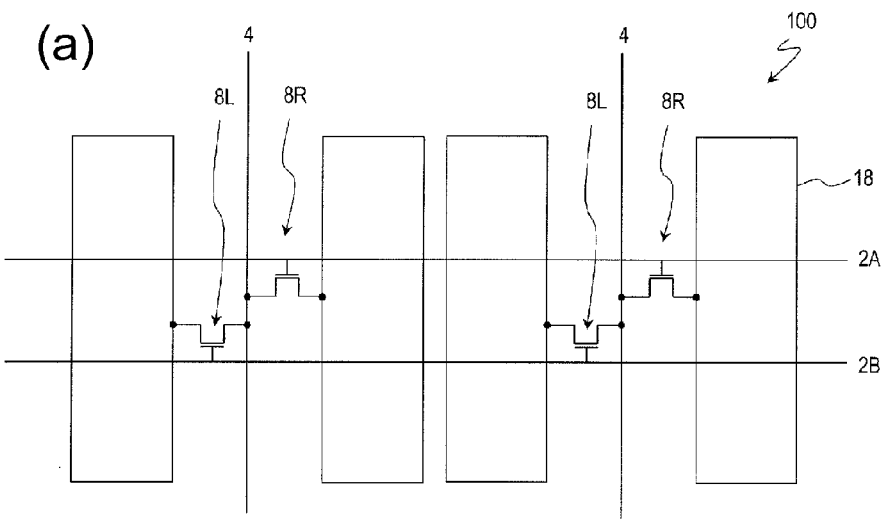
Figure 13:
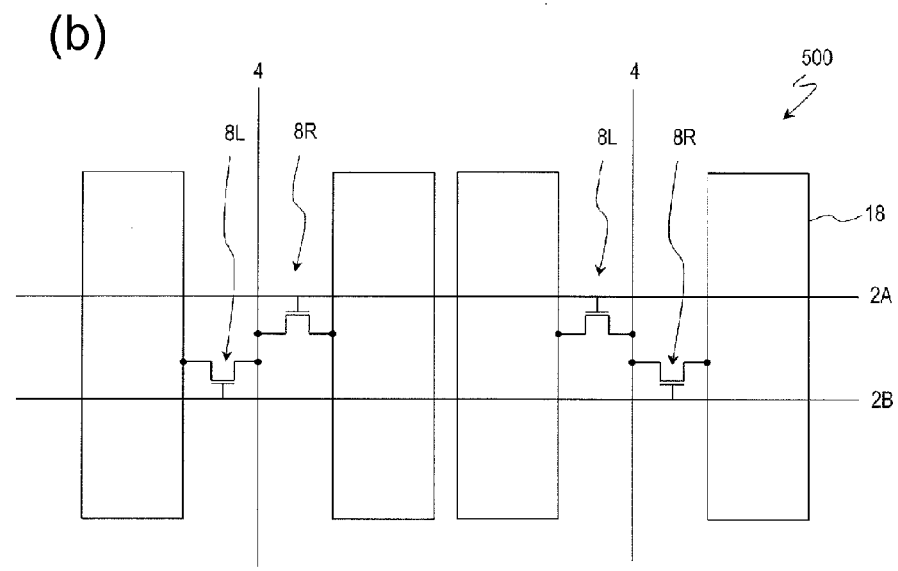

FIG. 13(a) shows a circuit configuration corresponding to the liquid crystal display device 100 of Embodiment 1, and FIG. 13(b) shows a circuit configuration of a liquid crystal display device 500 of Embodiment 5.

In the liquid crystal display device 100 of Embodiment 1, TFTs 8R and 8L of two pixels (two pixels aligned in the horizontal direction) sandwiched between two adjacent data bus lines 4 were connected to different gate bus lines 2A and 2B.

However, as in the liquid crystal display device 500 of Embodiment 5, two TFTs 8R and 8L that are sandwiched between two adjacent data bus lines 4 may be connected to the same gate bus line (first gate bus line 2A, for example). However, the TFTs 8L and 8R of the left and right pixels connected to the common data bus line 4 (or, the two TFTs 8L and 8R that are aligned in the horizontal direction with the data bus line 4 therebetween) are connected to different gate bus lines 2A and 2B, respectively.

Even with this type of configuration, in the respective pixels, the gate bus lines are provided so as to cross a pixel, and by disposing the TFT and the contact hole so as to be adjacent between the two gate bus lines, for example, and by integrally shielding these from light with a black matrix, the pixel aperture ratio can be improved.

Embodiments of the present invention has been described above, but the present invention may have other various configurations.

Figure 14:
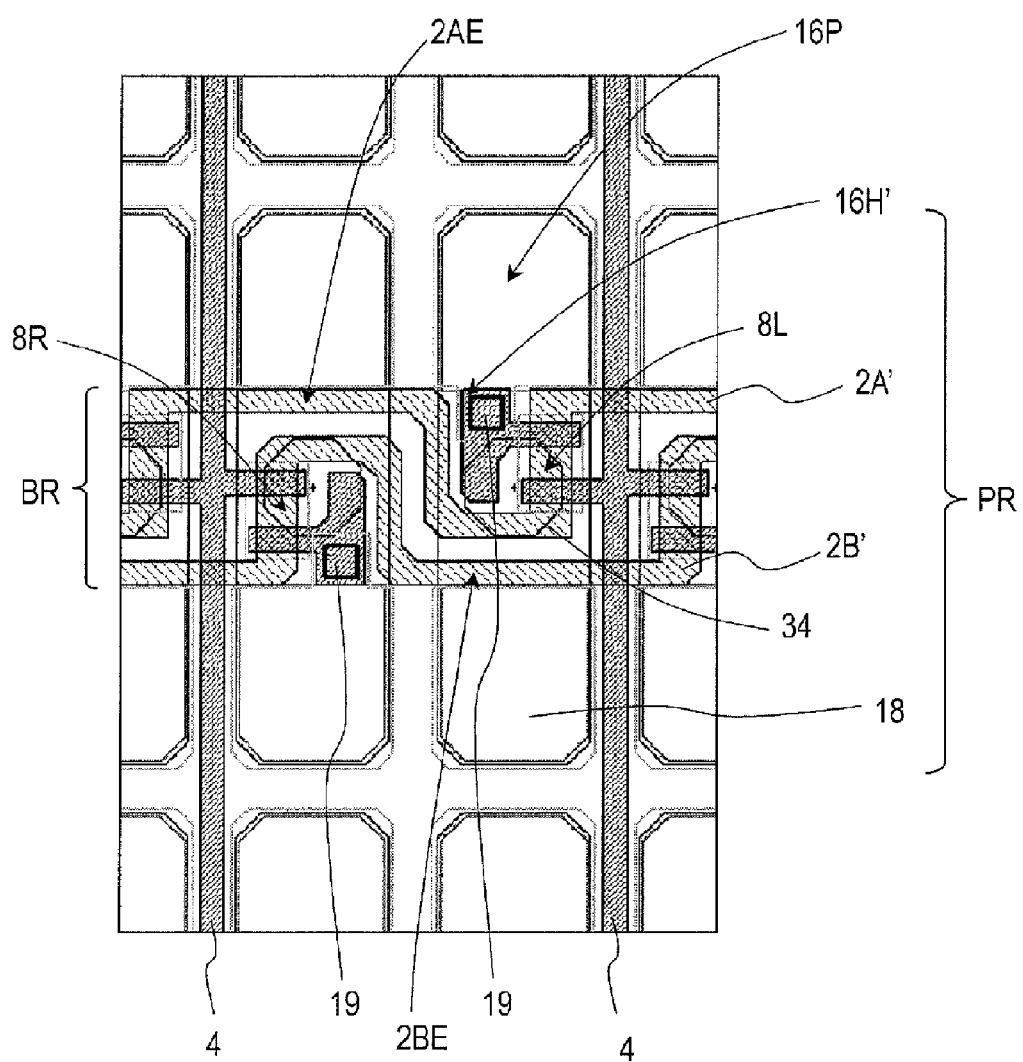
FIG. 14 is a plan view showing a liquid crystal display device according to another embodiment of the present invention.

As shown in FIG. 14, a pair of adjacent gate bus lines 2A' and 2B' provided for each horizontal row of pixels PR may have a portion that is bent.

In the configuration shown in FIG. 14, the TFTs 8L and 8R and the contact hole 19 are not disposed so as to be sandwiched between the gate bus line 2A' and 2B'. However, even in the present embodiment, it is preferable that the TFT 8L and 8R and the contact hole 19 be arranged in the area sandwiched by line portions 2AE and 2BE that are located furthest towards the outside of the respective gate bus lines 2A' and 2B', or namely, in a belt-shaped region BR that extends in the center portion of the column of pixels.

According to this type of configuration, the gate bus lines 2A' and 2B', the TFTs 8L and 8R, and the contact hole 19 (including the protruding structure 34 of the present embodiment) are disposed so as to be adjacent. Thus, it is possible to integrally cover these with the black matrix BM as shown in FIG. 4(c). As a result, the aperture ration can be improved more than if the respective areas that should be shielded from light (and portions formed of a light-shielding material) are disposed in separate locations.

Furthermore, in the configuration shown in FIG. 14, the opening 16H' for the contact hole in the auxiliary capacitance electrode 16 is linked to a pixel opening 16P where the contact hole 19 is formed in the edge portions of the belt-shaped region BR. In the present specification, the opening 16H' for the contact hole provided in the auxiliary capacitance electrode 16 may be connected to another opening 16P in this manner, and thus may be formed as a cutout portion.

Furthermore, as another configuration, the color filter CF and the black matrix BM may be provided on the TFT substrate 110 without providing them on the opposite substrate 130. The black matrix BM may be disposed at an appropriate location towards the outside of the liquid crystal layer 120. Furthermore, the protruding structure 34 that is used as an orientation regulating protrusion, a columnar spacer, or the like does not need to be formed on the opposite substrate 130 and may be provided on the TFT substrate 110.

Furthermore, a case in which the pixels are aligned in the horizontal direction or the vertical direction has been described above, but the pixels may be aligned in a delta pattern. If a delta pattern is adopted, then for each row of pixels, the orientation of the pixels is shifted by half a pixel pitch, and the data bus line is extended in a crank-like shape, but by disposing two adjacent gate bus lines so as to cross a center portion of the pixels, a configuration with a similar configuration to the embodiment described above can be achieved. Furthermore, by having the periphery of the pixel electrode or the like as a reflective electrode, a transflective liquid crystal display device can be configured.

Furthermore, as disclosed in WO 2012/147722, not only the pixel electrode directly connected to the TFT, but a sub pixel in a floating state that is connected through a coupling capacitance may be provided to form a multi-pixel configuration.

INDUSTRIAL APPLICABILITY

The liquid crystal display device in one embodiment of the present invention is widely used in various liquid crystal display devices and small-sized/high resolution display devices used in smartphones.

DESCRIPTION OF REFERENCE CHARACTERS 100 liquid crystal display device
110 TFT substrate
120 liquid crystal layer
130 opposite substrate
2 gate bus line
2A first gate bus line
2B second gate bus line
4, 41, 42 data bus line
6 auxiliary capacitance electrode main line
8, 8R, 8L TFT (thin film transistor)
10, 30 transparent substrate
12 gate electrode
14 source electrode
15 drain electrode
15' drain connection part
16 auxiliary capacitance electrode
18, 28 pixel electrode
19 contact hole
20 gate insulating film
22 passivation film (first insulating film)
24 planarizing film (first insulating film)
26 second insulating layer
32 opposite electrode
34 protruding structure
PXR, PXL pixel
PR row of pixels
PC column of pixels
BM black matrix (light-shielding member)
CF color filter

What is claimed is:

1. A liquid crystal display device, comprising:
a thin film transistor substrate;
an opposite substrate;
a liquid crystal layer disposed between the thin film transistor substrate and the opposite substrate, the liquid crystal layer being formed of liquid crystal material having a negative dielectric anisotropy; and
a black matrix disposed on an outside of the liquid crystal layer, the black matrix having light-shielding characteristics,
wherein the thin film transistor substrate includes:
a first gate bus line extending along a first direction, and a second gate bus line extending parallel and adjacent to the first gate bus line;
a first data bus line extending along a second direction that intersects with the first direction;
a first thin film transistor and a second thin film transistor that are respectively connected to the first gate bus line and the second gate bus line and that are both connected to the first data bus line, the first thin film transistor and the second thin film transistor being disposed along the first direction side-by-side; and
a first pixel electrode and a second pixel electrode that are respectively connected to the first thin film transistor and the second thin film transistor through a first contact hole and a second contact hole, respectively, the first pixel electrode and the second pixel electrode being disposed along the first direction side-by-side,
wherein, when seen from a direction normal to the thin film transistor substrate, the first gate bus line and the second gate bus line cross the first pixel electrode and the second pixel electrode and are disposed so as to overlap the first pixel electrode and the second pixel electrode, and
wherein the black matrix has a first inter-pixel light-shielding portion that covers both the first thin film transistor and the first contact hole and a second inter-pixel light-shielding portion that covers both the second thin film transistor and the second contact hole.

2. The liquid crystal display device according to claim 1, wherein the first thin film transistor, the second thin film transistor, the first contact hole, and the second contact hole are disposed so as to be sandwiched between the first gate bus line and the second gate bus line in a plan view.

3. The liquid crystal display device according to claim 1, wherein the thin film transistor substrate further comprises:
a first insulating layer formed on the first thin film transistor and the second thin film transistor;
an auxiliary capacitance electrode formed on the first insulating layer, said auxiliary capacitance electrode having, for each of the first contact hole and the second contact hole, at least one opening corresponding thereto; and
a second insulating layer formed on the auxiliary capacitance electrode and formed below the first pixel electrode and the second pixel electrode,
wherein the first contact hole and the second contact hole penetrate the first insulating layer, the opening in the auxiliary capacitance electrode, and the second insulating layer.

4. The liquid crystal display device according to claim 3, wherein the auxiliary capacitance electrode includes a first portion that overlaps the first inter-pixel light-shielding portion of the black matrix, a second portion that overlaps the second inter-pixel light-shielding portion of the black matrix, and an opening that overlaps the first pixel electrode and the second pixel electrode outside of said first portion and said second portion.

5. The liquid crystal display device according to claim 4, wherein the auxiliary capacitance electrode is formed of a non-transparent conductive material.

6. The liquid crystal display device according to claim 1, further comprising:
   at least one protruding structure provided between the thin film transistor substrate and the opposite substrate,
   wherein said at least one protruding structure overlaps at least one of the first inter-pixel light-shielding portion and the second inter-pixel light-shielding portion of the black matrix when seen from the direction normal to the thin film transistor substrate.

7. The liquid crystal display device according to claim 6, wherein said at least one protruding structure is at least either of a protruding structure formed as an orientation regulating structure or a protruding structure formed as a columnar spacer.

8. The liquid crystal display device according to claim 6, wherein said at least one protruding structure further comprises:
   a first protruding structure that is located in a center portion of the first pixel electrode and overlaps the first inter-pixel light-shielding portion when seen from the direction normal to the thin film transistor substrate,
   a second protruding structure that is located in a center portion of the second pixel electrode and overlaps the second inter-pixel light-shielding portion when seen from the direction normal to the thin film transistor substrate.

9. The liquid crystal display device according to claim 8, wherein the first protruding structure is disposed so as to at least partially overlap the first thin film transistor and the first contact hole when seen from the direction normal to the thin film transistor substrate, and
   wherein the second protruding structure is disposed so as to at least partially overlap the second thin film transistor and the second contact hole when seen from the direction normal to the thin film transistor substrate.

10. The liquid crystal display device according to claim 8, wherein the first protruding structure and the second protruding structure respectively control the orientation of liquid crystal molecules in the liquid crystal layer such that the liquid crystal molecules are respectively oriented around the first protruding structure and the second protruding structure in a radial manner when voltage is applied.

11. The liquid crystal display device according to claim 1, wherein the first pixel electrode and the second pixel electrode respectively include a plurality of first branch electrodes that extend in a third direction, a plurality of second branch electrodes that extend in a fourth direction, a plurality of third branch electrodes that extend in a fifth direction, and a plurality of fourth electrodes that extend in a sixth direction, said third direction, said fourth direction, said fifth direction, and said sixth direction being different from each other.

12. The liquid crystal display device according to claim 1, wherein the thin film transistor substrate further comprises:
   a second data bus line that extends along the second direction and that is adjacent to the first data bus line; and
   a pair of thin film transistors and a pair of pixel electrodes that are connected to the second data bus line and arranged along the first direction,
   wherein one of the first pixel electrode and the second pixel electrode connected to the first data bus line and one of the pair of pixel electrodes connected to the second data bus line are arranged along the first direction so as to be sandwiched between the first data bus line and the second data bus line.

13. The liquid crystal display device according to claim 12, wherein the thin film transistor substrate further includes a light-shielding member that extends along the second direction in a gap between the two pixel electrodes that are sandwiched between the first data bus line and the second data bus line.

14. The liquid crystal display device according to claim 13, wherein the light-shielding member is formed of a same material as the first data bus line and the second data bus line or a same material as the first gate bus line and second gate bus line.

15. The liquid crystal display device according to claim 1, further comprising:
   a data driver connected to the first data bus line and a gate driver connected to the first gate bus line and the second gate bus line,
   wherein the data driver and the gate driver are formed so as to be adjacent or formed integrally in a periphery of a display region.

* * * * *